March 18, 1969     T. W. SEGAR ET AL     3,433,584
PRODUCTION OF POTASSIUM NITRATE FROM CALCIUM NITRATE
Filed March 7, 1966
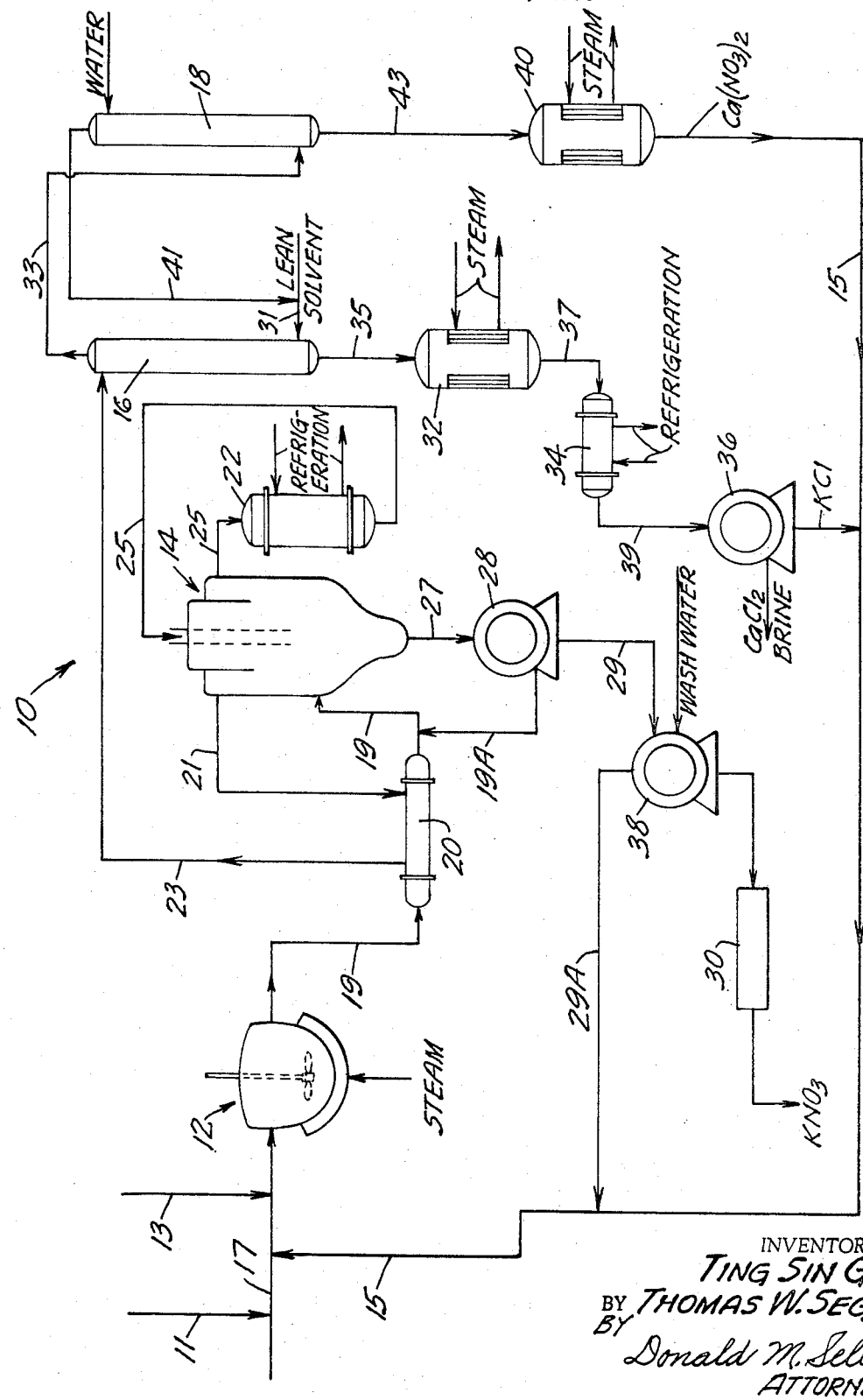
INVENTORS
*TING SIN GO*
BY *THOMAS W. SEGAR*
BY
*Donald M. Sell*
ATTORNEY

3,433,584
PRODUCTION OF POTASSIUM NITRATE FROM CALCIUM NITRATE

Thomas W. Segar, Minneapolis, and Ting Sin Go, Rosemount, Minn., assignors to St. Paul Ammonia Products, Inc., St. Paul, Minn., a corporation of Minnesota
Filed Mar. 7, 1966, Ser. No. 532,169
U.S. Cl. 23—102         7 Claims
Int. Cl. C01d 9/12

---

ABSTRACT OF THE DISCLOSURE

A process is provided for producing potassium nitrate from the reaction mixture of potassium chloride and calcium nitrate in aqueous solution by subjecting the remaining liquid following potassium nitrate precipitation to liquid-liquid extraction with a solvent for calcium nitrate to recover the nitrate values for reuse while avoiding any problem of coprecipitation of potassium chloride with potassium nitrate, thereby greatly increasing the effective yield of potassium nitrate in the process.

---

The present invention relates to the production of potassium nitrate and more particularly relates to a method for economically producing potassium nitrate from the reaction of calcium nitrate and potassium chloride in aqueous medium.

Fertilizer grade potassium nitrate, i.e., potassium nitrate having a chlorine content of less than one (1%) percent, has until very recently been obtainable only from natural sources, e.g., from mining or the processing of animal wastes. The economical synthesis of potassium nitrate has long been sought through the reaction of calcium nitrate and potassium chloride in aqueous solution. This route has many attractions because of its innate simplicity. The attractions are enhanced if the $KNO_3$ production is linked with the production of phosphoric acid, or phosphatic fertilizers, by the nitric acid acidulation of inorganic phosphate rock since the major by-product of this acidulation reaction is calcium nitrate tetrahydrate [$Ca(NO_3)_2 \cdot 4H_2O$].

Heretofore, the production of potassium nitrate by the reaction in aqueous solution of

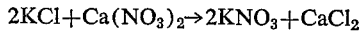
$$2KCl + Ca(NO_3)_2 \rightarrow 2KNO_3 + CaCl_2$$

has not been successful, either because the potassium nitrate yield has been too low or the procedures proposed to raise the yield have been too expensive. The yield of $KNO_3$ is ordinarily only about 65% since beyond this point KCl coprecipitates. It has heretofore been proposed to increase the yield by the addition of an alcohol to aqueous $Ca(NO_3)_2$—KCl solution, thereby reducing the solubility of the potassium nitrate in the solution and increasing the yield, e.g. (German Patent No. 606,385, November 1934). It has also been proposed to add ammonia gas to the residual liquor following potassium nitrate precipitation therefrom (e.g., U.S. Patent No. 1,835,704, issued Dec. 8, 1931). More recently ion exchange through a sulfonated styrene resin (e.g. U.S. Patent No. 2,751,280, issued Feb. 19, 1956), has been proposed. While all of these procedures are effective, they raise other problems. Thus, the addition of alcohol to increase crystallization of $KNO_3$ from calcium chloride brine while increasing $KNO_3$ crystallization to about 85%, also requires redistillation of the alcohol for reuse, which becomes economically unattractive. The addition of $NH_3$ in water results in undesirable nitrogen losses. With ion exchange, the sulfonated styrene used is initially expensive and an intricate alternating flow pattern necessitating a large number of exchange columns is required.

We have discovered a simple economical process for producing $KNO_3$ from the reaction of potassium chloride and calcium nitrate in aqueous solution which results in effective yields as $KNO_3$ of nearly 100% of theoretical without requiring the addition of reaction or solubility additives. By subjecting the calcium chloride brine resulting from the reaction of the KCl and $Ca(NO_3)_2$ to liquid-liquid extraction with a solvent for calcium nitrate we have found that nearly all of the unreacted nitrate and potassium values in the brine can be recovered to provide a procedure which results in practically quantitative yields of potassium nitrate. Insofar as we are aware no one has heretofore combined liquid-liquid extraction with the reaction in aqueous medium of potassium chloride and calcium nitrate to increase the effective yield of potassium nitrate. The advantages of this procedure are startlingly significant, transforming a heretofore uneconomical process into a readily practiced and economically practicable method for producing potassium nitrate.

In accordance with our invention potassium nitrate is produced by the reaction of potassium chloride with calcium nitrate in aqueous solution by a procedure which eliminates significant loss of nitrate or potassium ions, the process comprising precipitating potassium nitrate from the calcium chloride brine resulting from the reaction, $2KCl+Ca(NO_3)_2 \rightarrow 2KNO_3+CaCl_2$, and recovering the unreacted calcium nitrate from the brine by intimately contacting said brine with an organic solvent which is an extractant for calcium nitrate, which extractant is relatively stable in the presence of the nitrate ion, of low volatility and relatively insoluble in calcium chloride brine. Following extraction the rich solvent, or extractant, is made lean for reuse and the calcium nitrate recovered for further reaction with potassium chloride by back extraction with water. Following calcium nitrate removal, the unreacted potassium chloride remaining in the brine is recoverable by precipitation upon concentrating the now $Ca(NO_3)_2$ free brine in known manner.

In carrying out the process to obtain potassium nitrate of maximum purity the potassium chloride to calcium nitrate mol ratio, $2KCl/Ca(NO_3)_2$, should be from about 0.7 to 1.0. Preferably the mol ratio is less than stoichiometric, being from about 0.8 to about 0.9. If less than 0.7, the maximum amount of potassium nitrate is not precipitated and if the mol ratio is greater than about 1, then the potassium chloride tends to precipitate.

The weight ratio of water to reactants

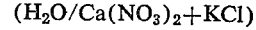
$$(H_2O/Ca(NO_3)_2+KCl)$$

in the initial aqueous solution should be maintained at about 0.7 to about 1.1. The preferred weight ratio is from about 0.8 to about 1; this results in a potassium nitrate yield of about 65% of theoretical. The less water used the higher the yield of $KNO_3$ in this initial reaction, but potassium chloride also tends to precipitate. Of course, the more water used the lower the yield of potassium nitrate.

Following precipitation of potassium nitrate, a calcium chloride brine remains containing in weight percent, in addition to water, about 65% calcium chloride ($CaCl_2$), about 17% potassium chloride (KCl) and about 17% calcium nitrate $Ca(NO_3)_2$, the latter two compounds representing unreacted portions.

Temperature also effects the potassium nitrate yield and while the highest crystallization of $KNO_3$ (about 68%) occurs at about $-23°$ C., at temperatures of about $-15°$ C. KCl also precipitates; thus, a practical low temperature range of $KNO_3$ crystallization is from about $5°$ C. to about $-10°$ C. At room temperature, e.g., $25°$ C., to about 30% of the potassium nitrate precipitates and the remaining 35% of the approximately 65% precipitated takes place at temperatures down around −10° C.

After precipitation of the KNO₃ by crystallization, the unreacted calcium nitrate and potassium chloride in the brine can be readily recovered for reuse, the unreacted calcium nitrate by the liquid-liquid extraction procedure of this invention and the potassium chloride by known concentration procedures.

To recover the unreacted calcium nitrate by liquid-liquid extraction, an organic liquid solvent must be chosen as an extractant in which calcium nitrate is soluble, which is stable in the presence of the nitrate ion, which is of low volatility, and of insignificant solubility in the calcium chloride brine. We have discovered that tributyl phosphate satisfies all of these requirements and is an excellent extractant for calcium nitrate which, even when calcium nitrate rich, is quite stable and readily handled under ordinary conditions. It is practically insoluble in calcium chloride brine and is readily made lean for reuse for further extraction by the simple expedient of back extracting with water.

Liquid-liquid extraction is ideally suited for continuous potassium nitrate production, the calcium chloride brine being contacted by counter-current flow with the extractant in a solvent (extractant) to feed (brine) ratio in parts by weight of about 3:1 to 6:1. If the amount of tributyl phosphate to water is below about 3:1 the number of stages required to extract the calcium nitrate from the brine becomes economically unattractive when used in amounts more than about 6:1, no advantage results and it is economically wasteful. Using 5 to 15 theoretical stages of counter-current flow in the extraction towers, about 99% of the nitrate value in the brine is recovered in the form of calcium nitrate. To recover the calcium nitrate from the rich extractant for reuse, the nitrate laden solvent is simply back extracted with water in a weight ratio of about one part water for each four to eight parts rich extractant. About five to six parts extractant for each part water in the back extraction is optimum, and a 13% by weight concentration of calcium nitrate in water results. This may be readily concentrated to about 23% and recycled into the system for further reaction with potassium chloride.

The unreacted potassium chloride is recovered from the remaining brine by concentrating the brine and cooling it to about 5° C. to −10° C. to precipitate the remaining KCl therefrom, which is then available for further reaction with calcium nitrate in the production of further potassium nitrate.

Because of its innate simplicity the process adapts itself extremely well to continuous production. A suitable arrangement for such production is illustrated in the accompanying drawing, the single figure of which depicts schematically a system suitable for practice of the invention as a continuous process.

Turning to this drawing in more detail, the processing equipment is designated in its entirety by the numeral 10, the major components thereof comprising a reactor 12, crystallizer 14, extracting column 16 and back extraction column 18. The reactants are mixed in the reacting vessel 12 for reaction and the resultant solution transported to the crystallization vessel 14 wherein potassium nitrate is precipitated. From the crystallization vessel 14 the calcium chloride brine remaining following KNO₃ removal and containing unreacted calcium nitrate and potassium chloride, is transported to the forward extraction column 16 wherein the extracting solvent contacts the brine by counter-current flow to extract the calcium nitrate therefrom. The calcium nitrate rich extractant is next transported to the back extraction column 18 wherein the calcium nitrate is stripped therefrom by counter-current flow with water as the feed. The lean solvent extractant is then returned to the forward extraction column and the calcium nitrate aqueous solution is concentrated for return to the reaction vessel 12. This basic apparatus is augmented with suitable piping, heat exchangers, centrifuges, evaporators and other auxiliary components to make the process.

Lines 11, 13, and 15 feed into the main line 17 conducting calcium nitrate tetrahydrate to the reacting vessel 12. Line 11 carries calcium hydroxide as a neutralizing agent to neutralize any free acids which may still remain in the calcium nitrate tetrahydrate, presuming that the calcium nitrate tetrahydrate by-product of a nitric-phosphate process is used as the nitrate source. Line 13 is the potassium chloride feed and line 15 is a recycling line returning potassium chloride and calcium nitrate for recycling through the reactor 12. Steam is provided to heat the reactor 12 to a temperature of approximately 70° C. to assure dissolution of the reactants and completion of the reaction. The principal reactions are:

$$Ca(NO_3)_2 + 2KCl \rightarrow 2KNO_3 + CaCl_2$$
$$Ca(OH)_2 + 2HNO_3 \rightarrow Ca(NO_3)_2 + 2H_2O$$

The resulting reaction liquor is then fed through line 19 through a heat exchanger 20 wherein it is cooled by heat exchange with calcium chloride brine from which the potassium nitrate crystals have been removed which brine is brought from the crystallizer 14 through line 21 through the heat exchanger 20 and out therefrom through the line 23 to the top of the forward extraction column 16. From the heat exchanger 20 the reaction liquor enters the crystallizer 14 where it is cooled to about −10° C. by circulating some of the liquor through refrigerated heat exchanger 22 by means of line 25.

The precipitated potassium nitrate is fed through line 27 to centrifuge 28 whereat the solid potassium nitrate is further separated from liquid material, the liquid material being returned via 19A to the crystallizer 14. The potassium nitrate solids are fed through line 29 through a centrifugal washer 38 to dryer 30 where the potassium nitrate is further dried and readied for market. Wash water from washer 38 is fed through line 29A to return line 15. Typically, the potassium nitrate, when dried in this fashion, contains approximately 44% K₂O, 13% nitrogen, 1% calcium and about 0.3% chloride, the remainder being insoluble materials.

The substantially potassium nitrate free calcium chloride brine containing unreacted calcium nitrate and potassium chloride drawn from the crystallizer 14 is, as previously noted, led by line 21 through heat exchanger 20 and thence through line 23 to the top of the forward extraction column 16. Lean solvent is introduced into the bottom of the forward extraction column 16 through line 31 so that it contacts the brine entering the top of the column 16 by counter-current flow. The unreacted calcium nitrate is extracted from the calcium chloride brine in this manner and the now calcium nitrate rich solvent is led from the top of the column 16 by means of line 33 to the bottom of the back extraction column 18.

The calcium nitrate rich solvent extractant enters the bottom of the back extraction column 18 while water is fed into the top of the column to back extract the calcium nitrate from the solvent. The lean solvent stripped of its calcium nitrate by this operation is then led from the top of the column by means of line 41 to join the solvent stream entering the bottom of the forwarding extraction column 16. The aqueous calcium nitrate solution recovered from the solvent is led by line 43 to evaporater 40 where it is concentrated from about 13% to about 23% and led through return line 15 to the reactor 12.

The raffinate, or remaining calcium chloride brine, from which the unreacted calcium nitrate has been stripped is led from the bottom of the forward extraction column 16 by means of line 35 to discharge, if it is not desired to recover the calcium chloride for sale as a by-product and/or recover the unreacted potassium chloride. However, if either of these two compounds is desired for economic reasons the raffinate is conducted to an evaporater 32, or perhaps a plurality of such evaporaters to concentrate the brine to about 40% calcium chloride. The so-concentrated brine is then led through line 37 to a heat exchanger 34 which is refrigerated to cool the brine to about 0° C. whereupon the potassium chloride is crystallized and precipitated therefrom. The slurry is then centrifuged in a centrifuge 36, being led thereto through the line 39 from the heat exchanger 34. The centrifuged potassium chloride is then returned by way of line 15 to the reactor. The remaining calcium chloride brine may be sold as a by-product.

The invention is further illustrated in the example following:

Example

A mother liquor held at about 70° C. to assure complete dissolution of solids was maintained at approximately the following values:

| Component | Parts by weight |
|---|---|
| Crude Ca(NO$_3$)$_2$·4H$_2$O | 1800 |
| Technical grade KCl (94.7%) | 1300 |
| Recycled Ca(NO$_3$)$_2$ solution | 2700 |
| Recycled potassium nitrate | 400 |
| Wash water | 800 |
| Calcium hydroxide | 30 |

This mother liquor was cooled in the crystallizer to approximately −10° C. and the potassium nitrate precipitated therefrom. The wet potassium nitrate precipitate is then washed with approximately 500 parts by weight water in a 3-stage current washing process. Following precipitation, washing, and drying of the potassium nitrate, the components analyzed as follows:

| Identification | Dried KNO$_3$ | Residual liquor | Wash water |
|---|---|---|---|
| Weight | 1,540 | 4,900 | 800 |
| Percent KNO$_3$ | 95.88 | | |
| Percent CaCl$_2$ | 0.69 | 18.61 | 7.70 |
| Percent Ca(NO$_3$)$_2$ | | 13.13 | 6.59 |
| Percent KCl | 0.15 | 6.20 | 15.01 |

The residual liquor is then led to a 9-stage mixer-settler where it is brought into countercurrent flow contact with tributyl phosphate at ambient temperature at a solvent to feed ratio of about 4.6 to 1 whereupon the calcium nitrate is extracted from the residual liquor leaving a raffinate and rich solvent composition as follows:

| Identification | Raffinate composition | Rich solvent composition |
|---|---|---|
| Weight | 4,770 | 22,750 |
| Percent CaCl$_2$ | 17.03 | 0.46 |
| Percent Ca(NO$_3$)$_2$ | 0.38 | 2.76 |
| Percent KCl | 6.78 | |

Then by back extraction in a 7-stage mixer-settler the calcium nitrate is removed from the rich solvent by countercurrent flow contact with fresh water, again at ambient temperature, with a solvent to water ratio of about 5.8 to 1 resulting in a calcium nitrate solution after concentration of 23.43% calcium nitrate with approximately 3.9% calcium chloride. The new lean tributyl phosphate solvent, with slightly greater than 0.001 percent CaCl$_2$ or calcium nitrate, is ready for reuse.

By concentrating the raffinate to about 40% CaCl$_2$ and chilling the brine to about 0° C. the KCl was precipitated, analyzing about 77.55% KCl, 5.44% CaCl$_2$, and about 0.1% Ca(NO$_3$)$_2$, with the remainder being inert matter. The remaining calcium chloride brine contained about 44.38% CaCl$_2$, about 1% Ca(NO$_3$)$_2$ and about 1.5% KCl.

By close control and familiarity with the system, yields of KNO$_3$ approaching 100% are possible.

Of course, many variations of the systems from the particular mode of practice described will occur to those skilled in the art. Thus, for example, the solvent may be first mixed with a diluent to provide a lower specific gravity, becoming considerably lighter than water and thereby facilitating the back extraction of calcium nitrate from the solvent extractant. This, as well as other variations may be practiced within the ambit of this invention, depending upon the economies of the particular operational environment. Thus, where equipment size is not a problem, the solvent-diluent procedure may be very advantageous whereas in other systems, the capacity requirements of this system may be such as to militate against such a procedure.

The tributyl phosphate is an excellent solvent in this operation, since it is non-volatile and extremely inert in the presence of the nitrate ions, making the extraction at once safe and practical.

We claim:

1. A process for producing potassium nitrate by the reaction of potassium chloride with calcium nitrate without significant nitrate loss which comprises reacting the potassium chloride and calcium nitrate in a $$2KCl/Ca(NO_3)_2$$

mol ratio of about 0.7 to 1 in an aqueous solution having an H$_2$O/2KCl+Ca(NO$_3$)$_2$ weight ratio of about 0.7 to 1.1, whereupon potassium nitrate is precipitated from the resulting calcium chloride brine, and extracting unreacted calcium nitrate from said brine by liquid-liquid extraction with about 3 to 6 parts tributyl phosphate, for each weight part of brine, and thereafter recovering extracted calcium nitrate from the now calcium nitrate rich tributyl phosphate by back extraction with about one part water for each 4 to 8 parts by weight tributyl phosphate whereupon both calcium nitrate and lean tributyl phosphate are recovered and available for reuse in the formation of further potassium nitrate.

2. The process of claim 1 wherein the calcium chloride brine following removal of precipitated potassium nitrate and unreacted calcium nitrate therefrom is further concentrated to precipitate potassium chloride therefrom for reuse in the formation of potassium nitrate.

3. A process for producing potassium nitrate from the reaction of potassium chloride with calcium nitrate in aqueous solution without significant loss of potassium or nitrate ions, said process comprising precipitating potassium nitrate from the calcium chloride brine resulting from the reaction, and recovering unreacted calcium nitrate from said brine by intimately contacting said brine with an organic extractant for calcium nitrate which extractant is relatively stable in the presence of the nitrate ion, of low volatility and relatively insoluble in calcium chloride brine, then removing calcium nitrate from the nitrate rich extractant by back extraction with water whereupon such calcium nitrate is available for further reaction with potassium chloride and the now lean extractant is available for further calcium nitrate extraction.

4. The process of claim 3 wherein said extractant is tributyl phosphate.

5. The process of claim 3 wherein the calcium chloride brine is further concentrated following removal of potassium nitrate and unreacted calcium nitrate therefrom to precipitate unreacted potassium chloride therefrom whereupon it is available for reaction with calcium nitrate in the preparation of further potassium nitrate.

6. The process of claim 3 wherein the $$2KCl/Ca(NO_3)_2$$

mol ratio is about 0.7 to 1 in said aqueous solution, and the H$_2$O/2KCl+Ca(NO$_3$)$_2$ weight ratio is about .7 to 1.1.

7. A process for producing potassium nitrate in high yield which comprises reacting potassium chloride with calcium nitrate in aqueous solution to form a calcium chloride brine from which potassium nitrate is precipitated, removing the precipitated potassium nitrate from said brine, extracting unreacted calcium nitrate from said brine by contacting said brine with tributyl phosphate and re-extracting calcium nitrate from said tributyl phosphate with water thereby recovering said tributyl phosphate as a lean solvent for subsequent calcium nitrate extraction and reclaiming unused calcium nitrate for further reaction with potassium chloride.

References Cited

UNITED STATES PATENTS 3,361,522   1/1968   Flatt _____ 23—102

OTHER REFERENCES

Healy et al.: Chem. Abstracts, vol. 51, p. 48f (January, 1957).

Kirgintsev et al.: Akad. Nauk SSSR, Doklady, vol. 159; pp. 887–9 (December 1964).

OSCAR R. VERTIZ, *Primary Examiner.*

ARTHUR J. GREIF, *Assistant Examiner.*